US012511470B2

(12) United States Patent
Stratton et al.

(10) Patent No.: US 12,511,470 B2
(45) Date of Patent: Dec. 30, 2025

(54) SYSTEMS AND METHODS FOR JOINT DOCUMENT SIGNING

(71) Applicant: ADOBE INC., San Jose, CA (US)

(72) Inventors: Norman A. Stratton, Littleton, MA (US); Jacob Scott Munsey, Monrovia, CA (US); Krishna Kishore Pilla, Dublin, CA (US); Justin Gerald Shillingford, San Jose, CA (US); James William Weider, Wayland, MA (US); Polai Av Eppert, Olympia, WA (US); Thu Hien Nguyen, San Francisco, CA (US); Sharon Hershon, Marlborough, MA (US); Christine Kuo, Jamaica Plain, MA (US)

(73) Assignee: ADOBE INC., San Jose, CA (US)

( * ) Notice: Subject to any disclaimer, the term of this patent is extended or adjusted under 35 U.S.C. 154(b) by 4 days.

(21) Appl. No.: 18/168,665

(22) Filed: Feb. 14, 2023

(65) Prior Publication Data

US 2024/0104295 A1  Mar. 28, 2024

(51) Int. Cl.
  *G06F 40/166*  (2020.01)
  *G06F 3/0484*  (2022.01)
  *H04L 65/1069*  (2022.01)

(52) U.S. Cl.
  CPC .......... *G06F 40/166* (2020.01); *G06F 3/0484* (2013.01); *H04L 65/1069* (2013.01)

(58) Field of Classification Search
  None
  See application file for complete search history.

(56) References Cited

U.S. PATENT DOCUMENTS

| 9,646,150 | B2 * | 5/2017 | Toth | G06F 21/45 |
| 2006/0015728 | A1 * | 1/2006 | Ballinger | H04L 63/20 |
| | | | | 713/172 |
| 2006/0174016 | A1 * | 8/2006 | Critchley | G06F 9/546 |
| | | | | 709/228 |
| 2007/0277040 | A1 * | 11/2007 | Scheidt | H04L 9/3033 |
| | | | | 713/176 |
| 2018/0239959 | A1 * | 8/2018 | Bui | G06F 16/93 |
| 2019/0074976 | A1 | 3/2019 | Hancock | |

(Continued)

FOREIGN PATENT DOCUMENTS

JP  2003-258793 A2  9/2003

OTHER PUBLICATIONS

Combined Search and Examination Report dated Jan. 17, 2024 in corresponding United Kingdom Patent Application No. 2311044.8 (7 pages).

*Primary Examiner* — Mandrita Brahmachari
(74) *Attorney, Agent, or Firm* — F. CHAU & ASSOCIATES, LLC (57) ABSTRACT

Systems and methods for joint document signing are described. According to one aspect, a method for joint document signing includes establishing a live communication session including a plurality of users. In some cases, the plurality of users correspond to a set of signers of a document. The method further includes initiating a signing process during the live communication session, receiving a signature for the document from each of the plurality of users during the live communication session based on the signing process, and generating a signed document including the signature from each of the plurality of users.

15 Claims, 6 Drawing Sheets

(56) References Cited

U.S. PATENT DOCUMENTS

2019/0121846 A1* 4/2019 Kim .................... G06F 3/04883
2021/0012289 A1* 1/2021 Hsieh ................... H04L 65/403
2021/0326482 A1* 10/2021 Sahgal ................. G06F 40/186

* cited by examiner

SYSTEMS AND METHODS FOR JOINT DOCUMENT SIGNING

CROSS-REFERENCE TO RELATED APPLICATION

This application claims priority under 35 U.S.C. § 119 to U.S. Provisional Application No. 63/376,612, filed on Sep. 22, 2022, in the United States Patent and Trademark Office, the disclosure of which is incorporated by reference herein in its entirety.

BACKGROUND

The following relates generally to document generation, and more specifically to the generation of a signed document. Documents may be generated using document generation software. For example, document generation software can be used to create a form document that includes digital content (such as paragraphs of text). In some cases, the content of the document is provided by a user, and in other cases, the content is derived from a database and corresponds to the type of document that is generated.

In some cases, the document generation software can collect a signature (such as an electronic signature) from a user that indicates that the user has signed the contents of the form document. In some cases, the document generation software creates a signed document including the contents of the form document and the signature of the user. The signed document can be shared with the signing user and with other users using digital communication channels, such as email, a website, a file sharing service, etc.

SUMMARY

Aspects of the present disclosure provide joint document signing during a single signing process of a live communication session. In some cases, a system according to aspects of the present disclosure matches a set of users of the live communication session to a list of signers of the document and initiates a signing session during which each of the set of users provides a signature for the document. Accordingly, aspects of the present disclosure streamline a joint document signing process by generating a signed document based on information provided in a single signing process and a single signing session.

A method, apparatus, non-transitory computer readable medium, and system for joint document signing are described. One or more aspects of the method, apparatus, non-transitory computer readable medium, and system include establishing a live communication session including a plurality of users, wherein the plurality of users correspond to a set of signers of a document; initiating a signing process during the live communication session; receiving a signature for the document from each of the plurality of users during the live communication session based on the signing process; and generating a signed document including the signature from each of the plurality of users.

DETAILED DESCRIPTION

The following relates generally to document generation, and more specifically to the generation of a signed document. Documents that require signatures (such as contracts, agreements, policies, etc.) may be generated using document generation software and shared with the signers of the document via digital communication channels (such as email, a website, cloud storage, etc.).

However, conventional document generation techniques cannot obtain multiple signatures for a document in a single signing process of a real-time or near-real time meeting. For example, conventional document generation techniques may ask a host of the meeting to manually select a signer at every signing stage of a signing process, or may restart an entire signing process for each individual signer of the document by asking the host to select a document to be signed and identifying the signer of the document to be signed for each signer of the document.

Accordingly, an aspect of the present disclosure provides a system for generating a signed document including multiple signatures during a real-time or near-real time meeting, such as a video conference, an audio conference, a text-based conference, etc. For example, the system initiates a live meeting including a host and attendees who have been invited to the meeting to sign a document. The system provides a user interface for the live meeting that allows the host to navigate a process of matching the attendees of the live meeting with a list of intended signers for the document.

When the attendees have been matched to the list of intended signers, the user interface allows the host to begin a process of collecting the signatures for the document from the attendees while the live meeting is ongoing. After the signatures are collected, the system generates the signed document including the multiple signatures.

By matching the attendees to the list of intended signers and allowing the attendees to sign the document while the live meeting is ongoing, the system streamlines a process of generating a signed document including multiple signatures so that the host can spend time discussing the document with the attendees rather than setting up individual signing processes to collect each signature.

An example use of the present disclosure in a joint document-signing context is collecting multiple signatures during a single video conference. For example, a document owner instructs the system to begin a video conference. The system recognizes the document owner as the host of the video conference. The host can invite a group of attendees to the video conference that the host intends to collect signatures from. The system provides a user interface for the video conference that allows the host to provide a document for signing and the attendees to confirm their identities and that they intend to sign the document.

Once each attendee has been confirmed to be a signer of the document, or the host decides that a sufficient number of attendees have been confirmed, the user interface allows the host to instruct the system to begin a process of collecting signatures for the document while the video conference is ongoing. This enables the host and the attendees to continue to discuss and review the document with each other while the signatures are collected, instead of singly creating a signing process for each signature. After each confirmed signer has signed the document, the system generates a signed document including the document and each of the signatures.

According to some aspects, a document signing system including a communication component, a signing component, an integration component, and a document generation component is provided. In some cases, the communication component establishes a live communication session including a plurality of users, where the plurality of users correspond to a set of signers of a document.

According to some aspects, the live communication session is a period of real-time or near real-time communication that is provided via a software application that is associated with a GUI. According to some aspects, the software application is the communication component. Accordingly, examples of a live communication session include a video conference, an audio conference, a text-based chat session, etc., that are associated with a GUI of a computing device.

In some cases, the signing component initiates a signing process during the live communication session. In some cases, the integration component receives a signature for the document from each of the plurality of users during the live communication session based on the signing process. In some cases, the document generation component generating a signed document including the signature from each of the plurality of users.

Embodiments of the present disclosure thereby allow multiple users to be designated by a host of the communication session as signers of a single document and to receive signatures from the users during a single signing process, rather than manually selecting a signer at every signing stage of the signing process, or restarting the signing process for each signer by selecting the document and then designating the signer.

Figure 1:
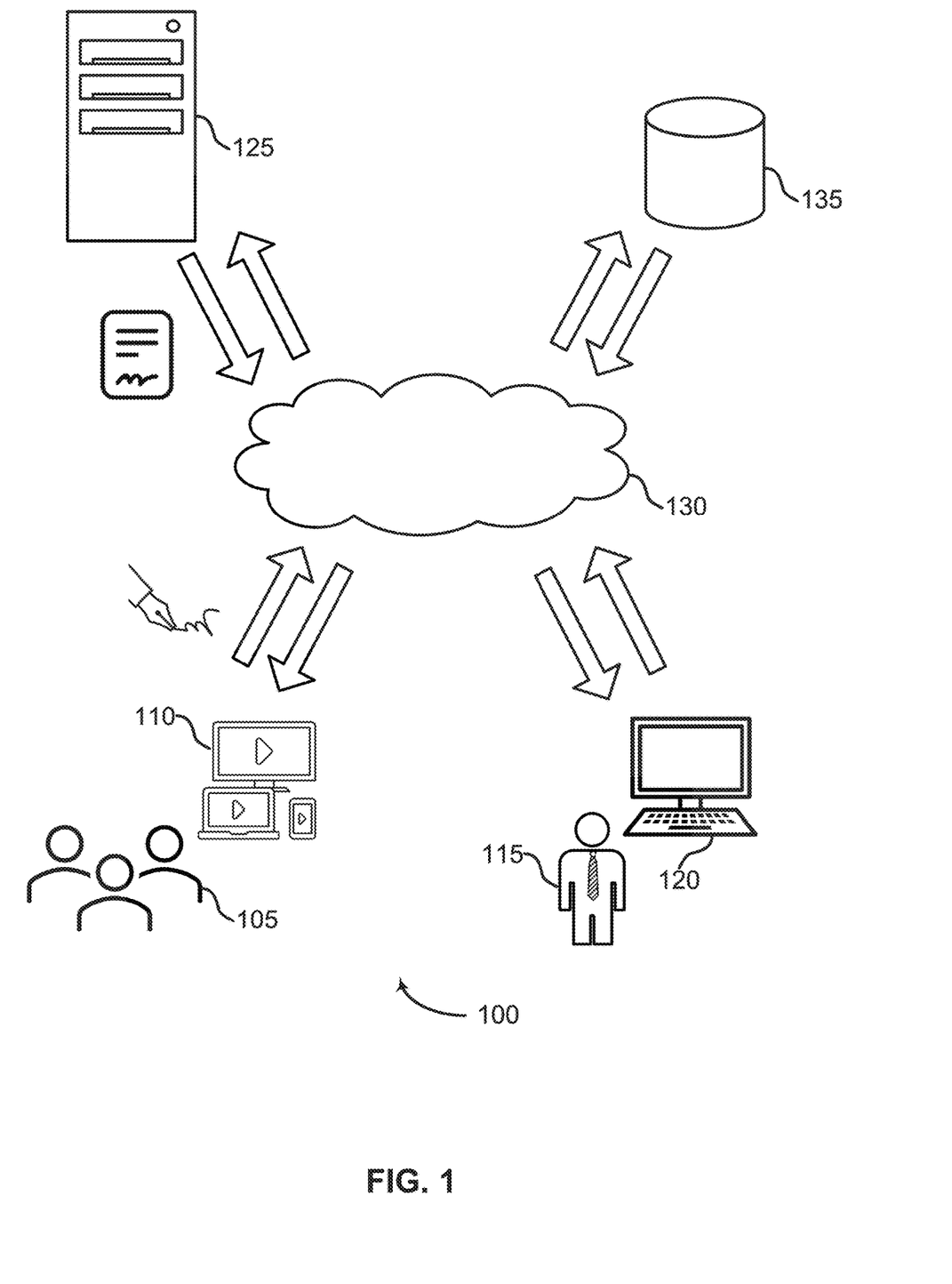
FIG. 1 shows an example of a document signing system according to aspects of the present disclosure.
Figure 2:
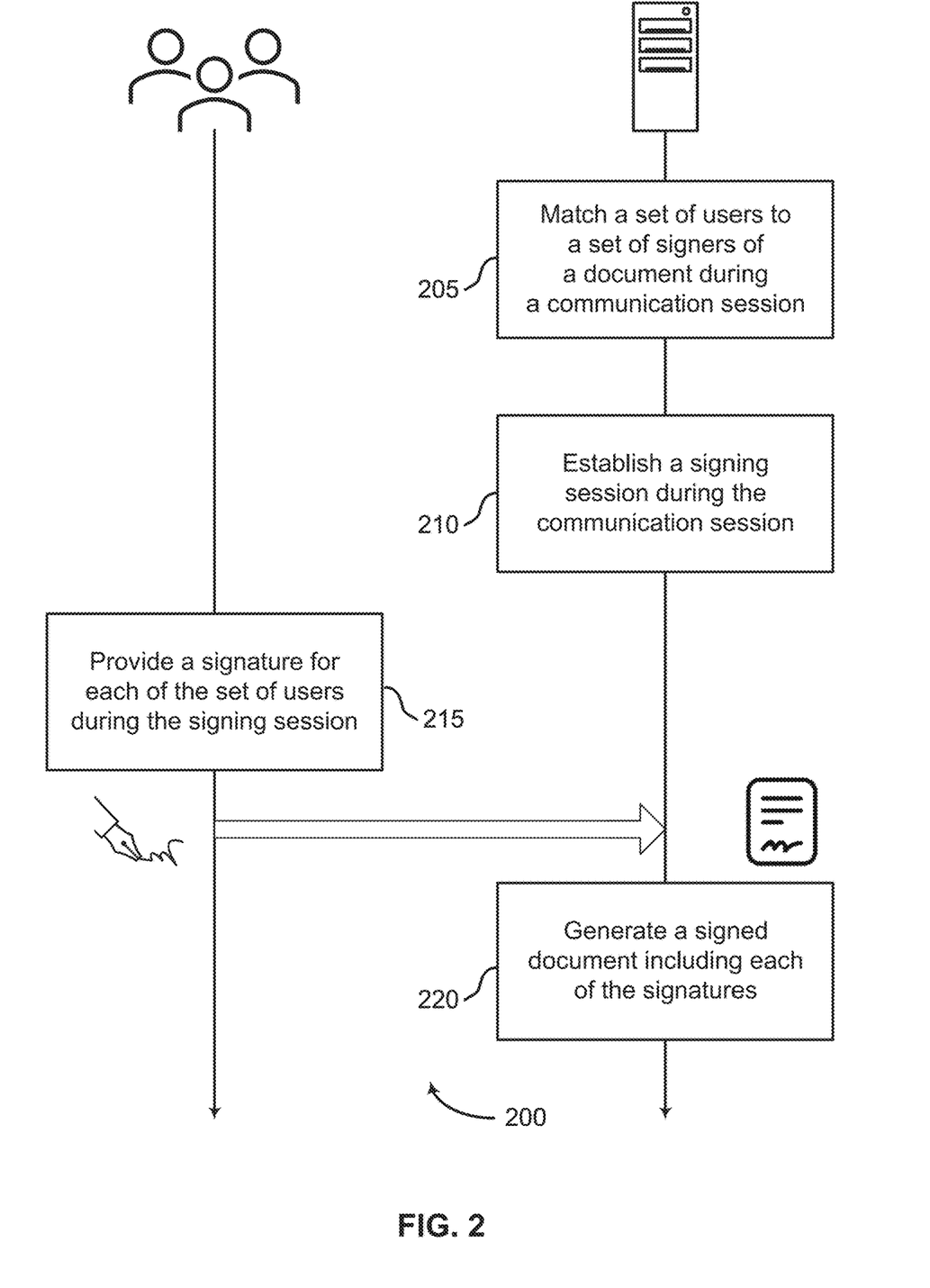
FIG. 2 shows an example of a method for joint document signing according to aspects of the present disclosure.

Further example applications of the present disclosure in the joint document signing context are provided with reference to FIGS. 1 and 2. Details regarding the architecture of the system are provided with reference to FIGS. 1, 3, and 6. Examples of a process for joint document signing are provided with reference to FIGS. 2, 4, and 5.

Document Signing System

FIG. 1 shows an example of a document signing system 100 according to aspects of the present disclosure. The example shown includes first users 105, first user devices 110, second user 115, second user device 120, document signing apparatus 125, cloud 130, and database 135.

Referring to FIG. 1, according to some aspects, document signing apparatus 125 initiates a live communication session including first users 105 and second user 115 and displays a document signing interface to second user 115 in a user interface of the live communication session.

As used herein, a "live communication session" refers to a period of real-time or near real-time communication. According to some aspects, the real-time or near real-time communication includes an exchange of data between one or more computing devices via communication components (including hardware, firmware, software, or a combination thereof) of the computing devices and according to a communication protocol. Examples of real-time or near real-time communication include the exchange of video, audio, and text data, or a combination thereof.

In some cases, second user 115 is a host of a signing session, during which a signed document is generated.

According to some aspects, document signing apparatus 125 identifies a document to be signed and first users 105 as signers of the document by matching first users 105 to a list of signers of the document. According to some aspects, in response to the identification, document signing apparatus 125 initiates a signing session, generates the document to be signed, and prompts first users 105 to confirm their identity and to sign the document according to ordered steps of the signing session corresponding to an order of signers. According to some aspects, after receiving signatures from each of first users 105, document signing apparatus 125 generates a signed document including the document, names of the signers of the document, signatures of the signers of the document, and ends the signing session and the signing process.

According to some aspects, each of first user devices 110 and second user device 120 is a personal computer, laptop computer, mainframe computer, palmtop computer, personal assistant, mobile device, or any other suitable processing apparatus. In some examples, each of first user devices 110 and second user device 120 includes software that respectively allows first users 105 and second user 115 to provide inputs to view a user interface of a live communication session and to provide inputs to the user interface as described with reference to FIG. 4.

According to some aspects, user interfaces enable first users 105 and second user 115 to respectively interact with first user devices 110 and second user device 120. In some aspects, each of the user interfaces may include an audio device, such as an external speaker system, an external display device such as a display screen, or an input device (e.g., a remote control device interfaced with the user interface directly or through an I/O controller module). In some cases, the user interfaces may be a graphical user interface (GUI). According to some aspects, a user interface is included in document signing apparatus 125, and first users 105 and/or second user 115 interact directly with document signing apparatus 125 via the user interface. According to some aspects, the user interface is provided by document signing apparatus 125 via first user devices 110 and second user device 120, and first users 105 and second user 115 interacts with document signing apparatus 125 via the user interface.

According to some aspects, document signing apparatus 125 includes a computer implemented network. In some aspects, document signing apparatus 125 also includes one or more processors, a memory subsystem, a communication interface, an I/O interface, one or more user interface components, and a bus. In some aspects, document signing apparatus 125 communicates with first user devices 110, second user device 120, database 135, or a combination thereof via cloud 130.

In some cases, document signing apparatus 125 is implemented on a server. A server provides one or more functions to users linked by way of one or more of various networks, such as cloud 130. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP) and simple mail transfer protocol (SMTP), although other protocols such as file transfer protocol (FTP) and simple network management protocol (SNMP) may also be used. In some cases, the server is configured to send and receive hypertext markup language (HTML) formatted files (e.g., for displaying web pages). In various aspects, the server comprises a general purpose computing device, a personal computer, a laptop computer, a mainframe computer, a supercomputer, or any other suitable processing apparatus. Document signing apparatus 125 is an example of, or includes aspects of, the corresponding element described with reference to FIG. 2 and/or FIG. 3.

Figure 3:
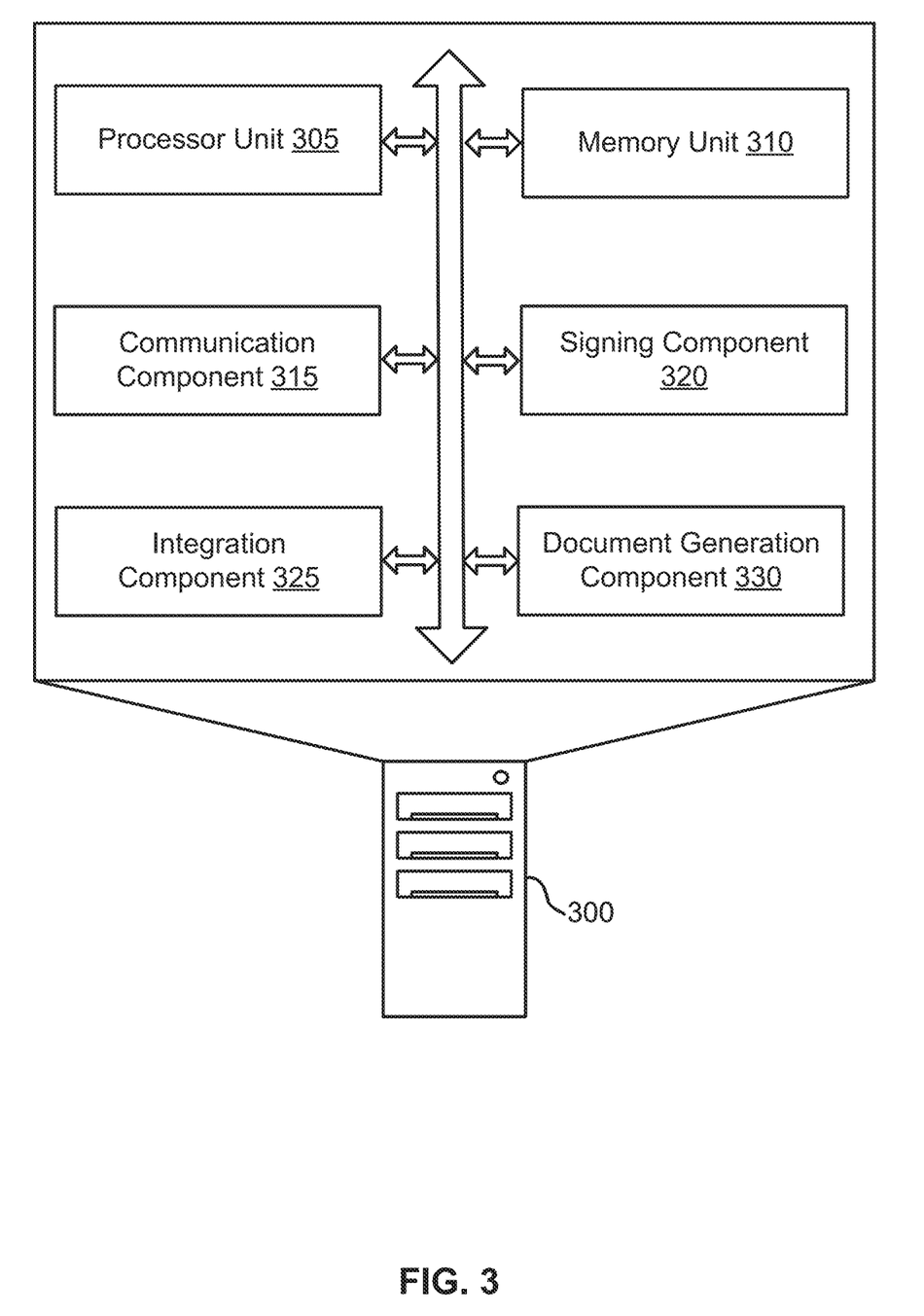
FIG. 3 shows an example of a document signing apparatus according to aspects of the present disclosure.
Figure 5:
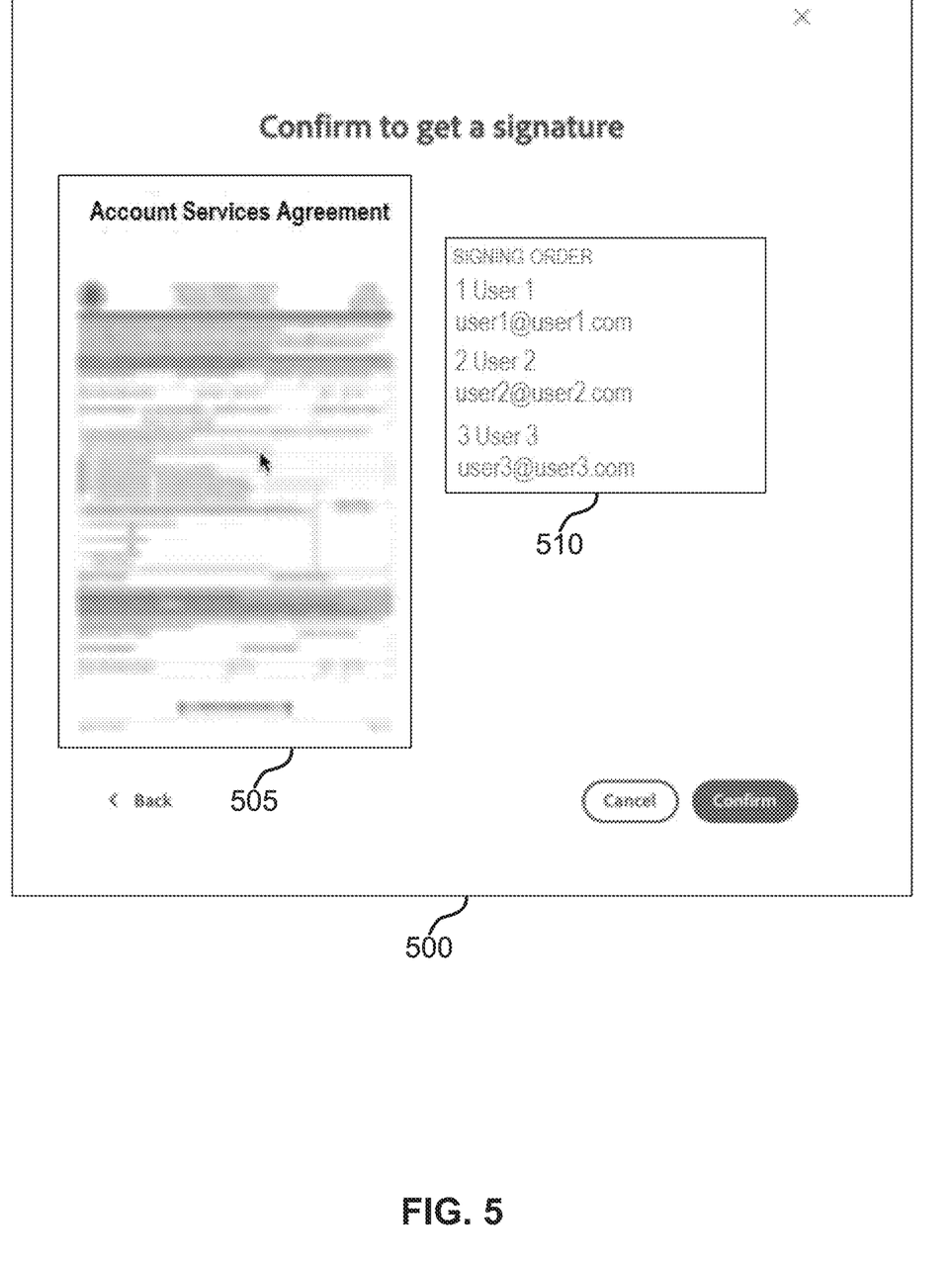
FIG. 5 shows an example of a document signing interface according to aspects of the present disclosure.
Figure 6:
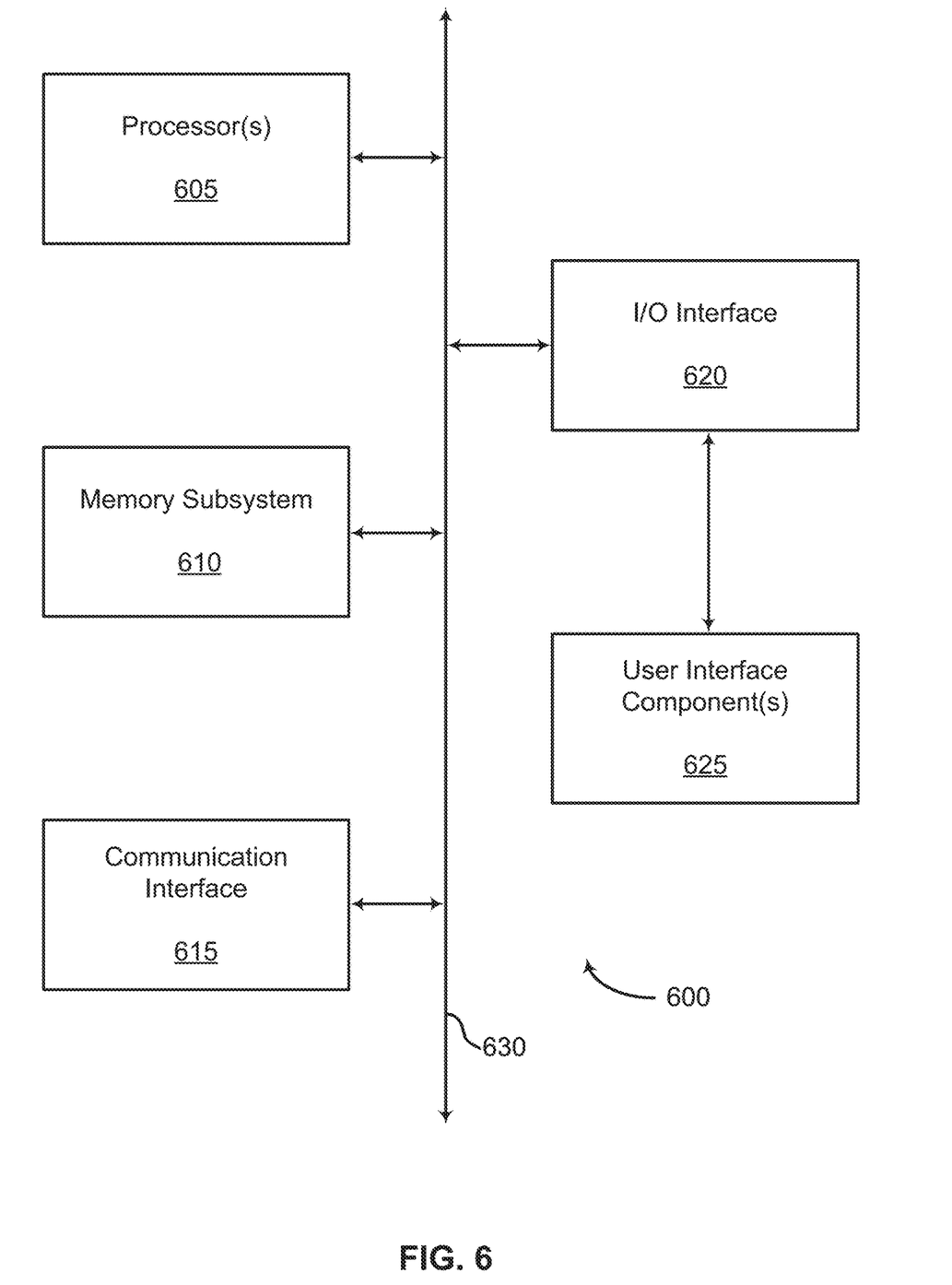
FIG. 6 shows an example of a computing device for document signing according to aspects of the present disclosure.

Further detail regarding the architecture of document signing apparatus 125 is provided with reference to FIGS. 3 and 6. Further detail regarding a process for joint document signing is provided with reference to FIGS. 2, 4, and 5.

According to some aspects, cloud 130 is a computer network configured to provide on-demand availability of computer system resources, such as data storage and computing power. In some examples, cloud 130 provides resources without active management by first users 105 and/or second user 115. The term "cloud" is sometimes used to describe data centers available to many users over the Internet. Some large cloud networks have functions distributed over multiple locations from central servers. A server is designated an edge server if it has a direct or close connection to a user. In some cases, cloud 130 is limited to a single organization. In other examples, cloud 130 is available to many organizations. In one example, cloud 130 includes a multi-layer communications network comprising multiple edge routers and core routers. In another example, cloud 130 is based on a local collection of switches in a single physical location. According to some aspects, cloud 130 provides communications between first user devices 110, second user device 120, document signing apparatus 125, database 135, or a combination thereof.

According to some aspects, database 135 is an organized collection of data. In some aspects, database 135 stores data in a specified format known as a schema. According to some aspects, database 135 is structured as a single database, a distributed database, multiple distributed databases, an emergency backup database, or a combination thereof. In some cases, a database controller manages data storage and processing in database 135. In some cases, first users 105 and/or second user 115 interact with the database controller. In other cases, the database controller operates automatically without user interaction. According to some aspects, database 135 stores documents that are out for signature, metadata corresponding to the document and signers of the document, a user display name, a user identifier, a signing session context, a context token, a signature input, a signature associated with the signature input, or a combination thereof as described with reference to FIG. 4. In some aspects, database 135 is external to document signing apparatus 125 and communicates with document signing apparatus 125 via cloud 130. In some aspects, database 135 is included in document signing apparatus 125.

FIG. 2 shows an example of a method 200 for joint document signing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, the system matches a set of users to a set of signers of a document during a live communication session, establishes a signing process during the live communication session, receives a signature input from each of the set of users during the signing process, and generates a signed document including each of the signatures.

At operation 205, the system matches a set of users to a set of signers of a document during a live communication session. In some cases, the operations of this step refer to, or may be performed by, a document signing apparatus as described with reference to FIGS. 1 and 3. In some cases, the document signing apparatus matches the set of users to the set of signers of the document during the live communication session as described with reference to FIG. 4.

In some examples, an "agreement" is a data structure that include comprises a document (or template document), a set of fields, values corresponding to the fields, a list of signers, a set of signatures, or any combination thereof. In some examples, the agreement may be generated during a live communication session that is based on teleconferencing software. A document signing service may be integrated into the teleconferencing software, and may be used to generate the agreement and sign the agreement during a live communication session. For example, a signing process or ceremony initiated by the signing service may be conducted within a live communication session of the teleconferencing software. Once all of the signatures are collected for the list of signers, the agreement can be considered signed or closed. In some cases, a signed or closed agreement (i.e., the signed document) is generated during the live communication session by identifying a document, setting values for the fields (optionally), identifying or selecting the list of signers, and by obtaining signatures from the signers. In some cases the agreement is generated prior to the session and one or more signatures may also be obtained prior to the session.

At operation 210, the system establishes a signing process during the live communication session. In some cases, the operations of this step refer to, or may be performed by, a document signing apparatus as described with reference to FIGS. 1 and 3. In some cases, the document signing apparatus establishes a signing process during the live communication session as described with reference to FIG. 4.

At operation 215, the system receives a signature from each of the set of users during the signing process. In some cases, the operations of this step refer to, or may be performed by, a document signing apparatus as described with reference to FIGS. 1 and 3. In some cases, the document signing apparatus receives a signature from each of the set of users during the signing process as described with reference to FIG. 4.

At operation 220, the system generates a signed document including each of the signatures. In some cases, the operations of this step refer to, or may be performed by, a document signing apparatus as described with reference to FIGS. 1 and 3. In some cases, the document signing apparatus generates a signed document including each of the signatures as described with reference to FIG. 4.

FIG. 3 shows an example of a document signing apparatus according to aspects of the present disclosure. Document signing apparatus 300 is an example of, or includes aspects of, the corresponding element described with reference to FIG. 1.

In one aspect, document signing apparatus 300 includes processor unit 305, memory unit 310, communication component 315, signing component 320, integration component 325, and document generation component 330. According to some aspects, document signing apparatus is an example of, or includes aspects of, the computing device described with reference to FIG. 6. For example, in some cases, communication component 315, signing component 320, integration component 325, and document generation component 330 are implemented as hardware circuits that interact with components similar to the ones illustrated in FIG. 6 via a channel. For example, in some cases, communication component 315, signing component 320, integration component 325, and document generation component 330 are implemented as software stored in a memory device. According to some aspects, processor unit 305 includes the one or more processors described with reference to FIG. 6. According to some aspects, memory unit 310 is an example of, or includes aspects of, the memory subsystem described with reference to FIG. 6.

Processor unit 305 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 305 is configured to operate a memory array using a memory controller. In other cases, a memory controller is integrated into processor unit 305. In some cases, processor unit 305 is configured to execute computer-readable instructions stored in memory unit 310 to perform various functions. In some aspects, processor unit 305 includes special purpose components for modem processing, baseband processing, digital signal processing, or transmission processing.

Memory unit 310 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 305 to perform various functions described herein. In some cases, memory unit 310 includes a basic input/output system (BIOS) that controls basic hardware or software operations, such as an interaction with peripheral components or devices. In some cases, memory unit 310 includes a memory controller that operates memory cells of memory unit 310. For example, the memory controller may include a row decoder, column decoder, or both. In some cases, memory cells within memory unit 310 store information in the form of a logical state.

According to some aspects, communication component 315 establishes a live communication session including a set of users, where the set of users correspond to a set of signers of a document. According to some aspects, communication component 315 is implemented as software stored in memory unit 310 and executable by processor unit 305, as firmware, as one or more hardware circuits, or as a combination thereof.

According to some aspects, signing component 320 initiates a signing process during the live communication session. In some examples, signing component 320 displays a signature interface in a user interface of the live communication session based on the signing process, where the signature is received via the signature interface.

In some examples, signing component 320 identifies a signing session context for the signing process based on the document and the set of signers of the document. In some examples, signing component 320 receives an input to identify the document during the live communication session, where the signing process is initiated based on the input.

In some examples, signing component 320 identifies the set of signers of the document. In some examples, signing component 320 invites the set of users to the live communication session based on identifying the set of signers. In some examples, signing component 320 matches each of the set of users to a signer of the set of signers of the document. In some examples, signing component 320 receives a confirmation input for the signing process during the live communication session, where the signing process is initiated based on the confirmation input.

According to some aspects, signing component 320 is implemented as software stored in memory unit 310 and executable by processor unit 305, as firmware, as one or more hardware circuits, or as a combination thereof.

According to some aspects, integration component 325 receives a signature for the document from each of the set of users during the live communication session based on the signing process. In some examples, integration component 325 generates a context token for the signing session context, where the signing process is based on the context token. In some examples, integration component 325 generates a signing session context for the signing process that includes a set of stages. In some examples, integration component 325 transmits a context token during each of the set of stages to synchronize the signing process.

According to some aspects, integration component 325 is implemented as software stored in memory unit 310 and executable by processor unit 305, as firmware, as one or more hardware circuits, or as a combination thereof.

According to some aspects, document generation component 330 generates a signed document including the signature from each of the set of users. According to some aspects, document generation component 330 is implemented as software stored in memory unit 310 and executable by processor unit 305, as firmware, as one or more hardware circuits, or as a combination thereof.

According to some aspects, document signing apparatus 300 is implemented as a computing device, such as a computing device described with reference to FIG. 6, and communication component 315, signing component 320, integration component 325, document generation component 330, or a combination thereof are implemented as one or more software applications stored in memory unit 310 and executable by processor unit 305. For example, in some cases, communication component 315, signing component 320, integration component 325, document generation component 330, or a combination thereof are implemented as a document signing application stored in memory unit 310 and executable by processor unit 305.

According to some aspects, document signing apparatus 300 is implemented as one or more servers, such as a server described with reference to FIG. 1, and communication component 315, signing component 320, integration component 325, document generation component 330, or a combination thereof are implemented as one or more servers that are configured to communicate with each other, such as by a cloud as described with reference to FIG. 1, and by one or more communication protocols. In some cases, communication component 315, signing component 320, integration component 325, document generation component 330, or a combination thereof communicate with each other via API calls. According to some aspects, integration component 325 is implemented as an integration server. According to some aspects, the integration server is external to document signing apparatus 300.

Joint Document Signing

A method for joint document signing is described with reference to FIGS. 4 and 5. One or more aspects of the method include establishing a live communication session including a plurality of users, wherein the plurality of users correspond to a set of signers of a document; initiating a signing process during the live communication session; receiving a signature for the document from each of the plurality of users during the live communication session based on the signing process; and generating a signed document including the signature from each of the plurality of users.

Some examples of the method further include displaying a signature interface in a user interface of the live communication session based on the signing process, wherein the signature is received via the signature interface. Some examples of the method further include identifying a signing session context for the signing process based on the document and the set of signers of the document. Some examples further include generating a context token for the signing session context, wherein the signing process is based on the context token.

Some examples of the method further include receiving an input to identify the document during the live communication session, wherein the signing process is initiated based on the input. Some examples of the method further include identifying the set of signers of the document. Some examples further include matching each of the plurality of users to a signer of the set of signers of the document.

Some examples of the method further include receiving a confirmation input for the signing process during the live communication session, wherein the signing process is initiated based on the confirmation input. Some examples of the method further include generating a signing session context for the signing process that includes a plurality of stages. Some examples further include transmitting a context token during each of the plurality of stages to synchronize the signing process.

Some examples of the method further include identifying the set of signers of the document. Some examples further include inviting the plurality of users to the live communication session based on identifying the set of signers.

Figure 4:
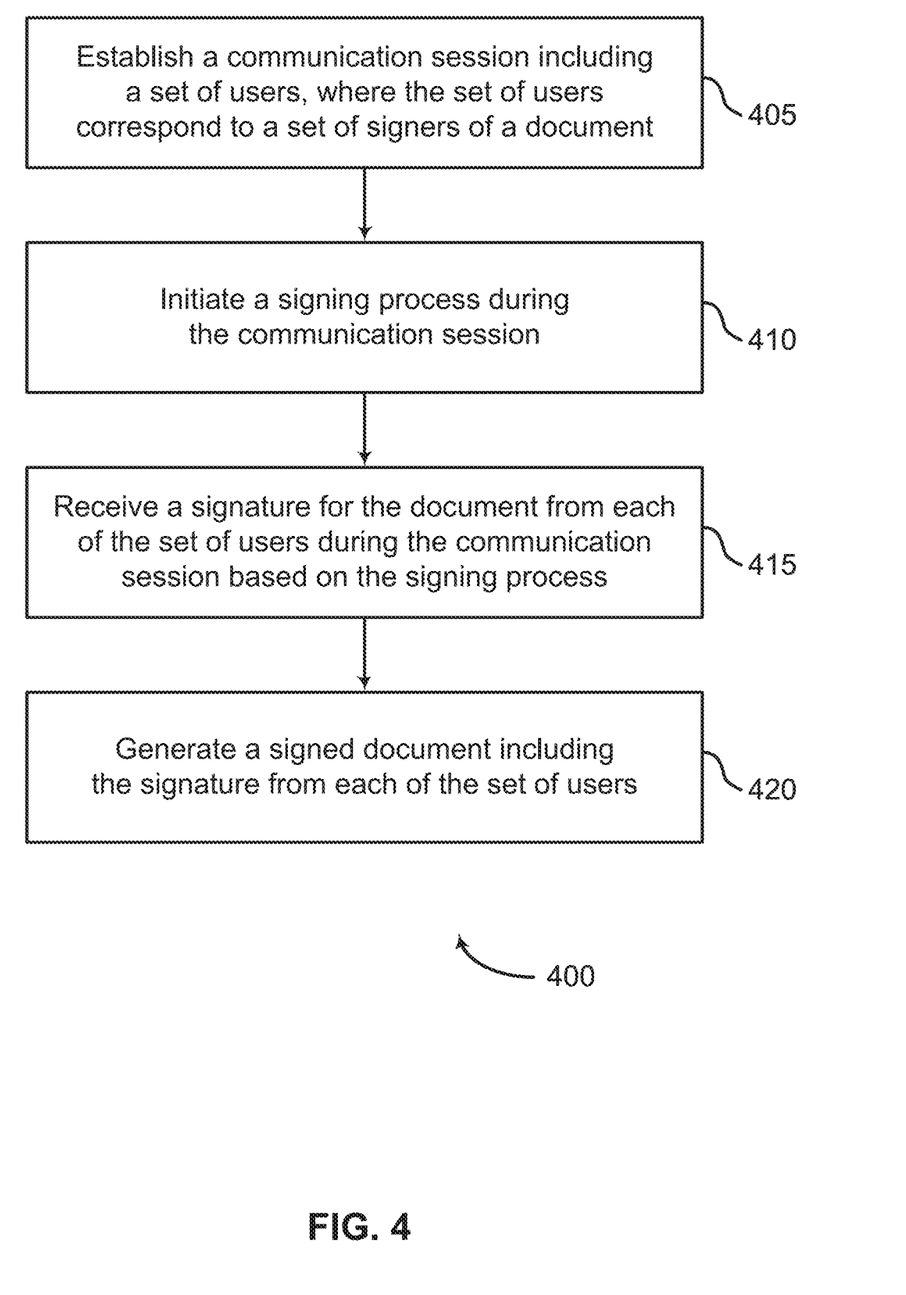
FIG. 4 shows an example of a method for generating a signed document including multiple signatures according to aspects of the present disclosure.

FIG. 4 shows an example of a method 400 for generating a signed document including multiple signatures according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 4, the system initiates a live communication session including a set of users, initiates a signing process in which the system identifies a document to be signed, matches the set of users to signers of the document to be signed, and initiates a signing session. During the signing session, the system receives signature inputs from the users matched to the signers of the document and generates a signed document including the document to be signed, names of the signers of the document to be signed, and signatures associated with the signature inputs. By matching the set of users to the document to be signed and allowing the set of users to provide signature inputs for the document to be signed during a single signing session, the system streamlines a process of generating a signed document so that a host of the signing session can spend more time discussing the document with the set of users than setting up the signing session for the next signature.

At operation 405, the system establishes a live communication session including a set of users, where the set of users correspond to a set of signers of a document. In some cases, the operations of this step refer to, or may be performed by, a communication component as described with reference to FIG. 3. According to some aspects, a live communication session is period of real-time or near real-time communication. According to some aspects, the real-time or near real-time communication includes an exchange of data between one or more computing devices via communication components (including hardware, firmware, software, or a combination thereof) of the computing devices and according to a communication protocol. Examples of real-time or near real-time communication include the exchange of video, audio, and text data, or a combination thereof.

According to some aspects, the live communication session is a period of real-time or near real-time communication that is provided via a software application that is associated with a GUI. According to some aspects, the software application is the communication component. Accordingly, examples of a live communication session include a video conference, an audio conference, a text-based chat session, etc., that are associated with a GUI of a computing device.

According to some aspects, a live communication session includes a "host". According to some aspects, the host is a user who prompts the communication component to initiate the live communication session, or is a user who is determined to be a host during the course of the live communication session. According to some aspects, a user included in the live communication session is identified according to a user identifier. According to some aspects, the user identifier is an identifier, such as an email address, that the user uses to log-in to software associated with the live communication session (e.g., the communication component).

According to some aspects, a user who is not logged in to the software associated with the live communication session is provided by the communication component with a temporary user identifier based on, for example, a characteristic of the user device associated with the user. According to some aspects, the communication component associates a host identifier with a user who is a host of the live communication session. According to some aspects, the communication component stores the user identifier, the host identifier, an association of the user identifier and/or the host identifier, or a combination thereof in a database as described with reference to FIG. 1.

At operation 410, the system initiates a signing process during the live communication session. In some cases, the operations of this step refer to, or may be performed by, a signing component as described with reference to FIG. 3. For example, according to some aspects, the host of the live communication session provides a document signing initiation input to a user interface of the live communication session (e.g., a GUI provided by a software application associated with the live communication session, such as the communication component), and the GUI provides the document signing initiation input to the signing component. According to some aspects, the signing component displays a document signing interface in the user interface of the live communication session in response to receiving the document signing initiation input. According to some aspects, the signing component identifies the user that provided the document signing initiation input as a host of a signing session.

For example, according to some aspects, a message extension can be triggered from a chat panel and the like of a user interface of the live communication session to initiate a process of displaying and/or dictating information such as a dialog to the host of the signing session. According to some aspects, the information (e.g. the dialog) guides the host of the signing session through a configuration of the signing session.

According to some aspects, the signing component provides the host of the signing session with a list of documents that are out for signature via the document signing interface. In some cases, the host selects the appropriate agreement using metadata associated with the list. For example, in some cases, the signing component retrieves the list of documents that are out for signature from the database and displays the list to the host of the signing session via the user interface of the live communication session. An example of a document that is out for signature is a document that has been generated and that includes metadata and the like that identifies a set of signers of the document. In some cases, a third party user can provide a document that is out for signature to the system via a user device, and the system stores the document that is out for signature in the database.

According to some aspects, the signing component fetches the list of documents that are out for signature (for example, from the database described with reference to FIG. 1) using the user identifier or other credentials of the host of the signing session. For example, in some cases, a document that is out for signature includes metadata that identifies an authorized host of a signing session related to the document that is out for signature, and the list of documents that are out for signature includes documents that are authorized to be displayed for the host of the signing session based on the user identifier of the host of the signing session.

According to some aspects, the signing component selects the document that is out for signature as a document to be signed based on the list of documents that are out for signature. For example, the host of the signing session may choose a document that is out for signature by providing a selection input to the document signing interface to select the document that is out for signature from the list of documents that are out for signature. According to some aspects, the list of documents that are out for signature and documents associated with the list of documents that are out for signature are stored in a database as described with reference to FIG. 1.

At operation 415, the system receives a signature for the document from each of the set of users during the live communication session based on the signing process. In some cases, the operations of this step refer to, or may be performed by, an integration component as described with reference to FIG. 3.

According to some aspects, in response to the host of the signing session identifying the document that is out for signature, the signing component identifies a set of signers of the document and matches a set of users of the live communication session to the set of signers via metadata included in the document that is out for signature. For example, in some cases, the signing component uses API calls and results from the communication component, the signing component, and/or one or more servers associated with the live communication session to gather information about users of the live communication session, the document that is out for signature, and metadata included in the document that is out for signature. For example, according to some aspects, once the document to be signed is selected by the host of the signing session, the signing component automatically generates matches between the document's signers and participants in the meeting. In some cases, if the email address of a meeting participant matches the email address of a signer of the document, then the participant is matched with that step of the document signing process.

According to some aspects, the signing component authenticates the set of users of the live communication session based on a user identifier for each of the set of users and includes the user identifier in a user identifier field of the document signing interface in response to the authentication. According to some aspects, a user of the live communication session whose authenticated user identifier matches that of a signer of the document (e.g., as identified in the metadata of the document) is automatically added by the signing component for the signing session. For example, in some cases, if a user has been authenticated into the live communication session by the communication component via a log-in with a user identifier such as an email address and the like, the signing component determines if the user identifier matches a user identifier included in the metadata of the document. In some cases, in response to the determination, the signing component authenticates the user and automatically populates a user identifier field of the document signing interface with the user identifier of the user.

According to some aspects, if the user has not been authenticated into the live communication session by the communication component, the signing component prompts the host via the document signing interface to enter a valid user identifier for the user. In some cases, for example, the signing component provides a message in the document signing interface (such as a drop-down picker) including a list of each user of the live communication session that omits any user that has been matched to a signer of the document so that the host of the signing session can manually match a user with a document signer by selecting the user from the list.

For example, in some cases, the signing component determines that a user of the set of users is not authenticated and displays a request to provide a user identifier for the non-authenticated user in the document signing interface to the host of the signing session. In some cases, when manually matching document signers to users, users that are already matched in a signing step are not available to sign on additional steps, thereby minimizing a possibility of selecting a same user to sign as an additional document signer.

According to some aspects, the signing component displays a list of users that are matched to the signers of the document and a representation of the document to be signed via a view of the document signing interface. For example, in some cases, the view of the document signing interface includes a list (in some cases, an ordered list) of user display names and a corresponding list (in some cases, an ordered list) of user identifiers (e.g., email addresses). An example of a document signing interface that displays an ordered list of users that match an ordered list of document signers is illustrated in FIG. 5.

According to some aspects, the host of the signing session can move to a next step in the signing process once a user is matched as a signer of the document, whether the user is matched as the signer automatically or manually by the host of the signing session choosing an appropriate user. In some cases, once the signing component has finished matching the set of users with the set of signers of the document, the host of the signing session can provide an input to the document signing interface to proceed to a confirmation page that lists the steps of the signing session and the users that will participate in the signing session.

According to some aspects, the host of the signing session may then confirm a configuration of the signing session by providing a confirmation input to the document signing interface (for example, by interacting with controls in a posted dialog box).

According to some aspects, the signing component initiates the signing session in response to the confirmation input, where the signatures are obtained during the signing session. For example, in some cases, when the host of the signing session provides a confirmation input (such as clicking a "confirm" button) to the document signing interface, the signing component sends a confirmation message to the integration component. In some cases, the signing component sends the information for the signing session (such as the document to be signed, the users matched as signers of the document, and user identifiers of the users) to the integration component in response to the confirmation input.

According to some aspects, providing the confirmation input closes a message displayed in the user interface of the live communication session (such as a dialog) and sends a message (for example, via a chat interface of the user interface of the live communication session) to the integration component.

According to some aspects, the integration component generates a signing session context for the signing session, where the signing session context includes a list of steps for the signing session and state data for orchestrating the signing session, and saves the record to a database record included in a database, such as the database described with reference to FIG. 1.

In some cases, the integration component generates a context token based on index values included in the database record. In some cases, the context token is salted and encrypted so that it may be passed as an opaque token (for example, via various API calls associated with the signing session). Encryption is the process of translating data into something that appears to be random. Decryption is the process of converting the encrypted data back into its original form. Symmetric encryption may be used to encrypt large amounts of data. For example, a symmetric key may be used during both the encryption and decryption processes. In some examples, an encryption algorithm may be used to make it as difficult as possible to decrypt the data without using the key. In some cases, there may be no technique significantly better than trying every possible key. For such an algorithm, using a longer key makes it more difficult to decrypt the data without the key. Examples of encryption algorithms include a data encryption standard (DES), triple DES, advanced encryption standard (AES), Rivest Shamir Adleman (RSA), or elliptic curve cryptosystem (ECC).

According to some aspects, the integration component constructs the signing session context for orchestrating the signing session, thereby registering to be notified of state changes of the document being signed (such as through events received by the signing component and/or one or more servers associated with the live communication session). In some cases, in each step of the signing session (for example, at each state change), an opaque context token is passed via APIs to synchronize the signing session context with the state of the document.

In some cases, the integration component registers a callback with the signing component for events related to changes of state of the document being signed, thereby adding the context token as part of callback data. In some cases, the context token is decrypted to obtain data from the context token and re-encrypted in each step of the signing session.

In some cases, during the signing session, the integration component provides a message (such as by posting a card to the chat interface of the live communication session, and the like) that invites a user of the live communication session to provide a review input to the user interface of the live communication session to review and sign the document. In some cases, the integration component provides the message via one or more APIs. In some cases, a portion of the user interface (such as a "command" button) corresponding to the message includes a command identifier indicating that the portion of the user interface is used to provide the review input. In some cases, the context token is included in the message to associate an input to the portion of the user interface (such as a click of the command button) and the command identifier with the signing session.

According to some aspects, the signing session proceeds according to an ordered list. For example, in some cases, the metadata included in the document to be signed identifies an order of users to sign the document, and a user that is identified as a signer of the document can provide a review input when it is their turn to do so according to the order of users. According to some aspects, the host of the signing session identifies the order of users to sign the document via the document signing interface. According to some aspects, the order of users to sign the document is not specified, and any user that is identified as a signer of the document can provide a review input at any point in the signing session. In some cases, each user of the live communication session can see the invitation to sign, but only a user who is identified as a signer of the document, or a user who is next on the list of signers of the document, can cause the signing session to proceed by providing the review input.

For example, in some cases, in response to receiving the review input from a user, the integration component displays to the user via the user interface of the live communication session a message (such as a dialog) prompting the user to confirm their identity by providing an accept input to the user interface.

In some cases, in response to another user of the live communication session attempting to provide an accept input to the user interface, the integration component displays a dialog indicating that the other user is not identified as a signer of the document, or that the user is not next on the list of signers.

According to some aspects, when a user provides the accept input, the integration component checks the identity of the user by comparing a user identifier corresponding to the user with data extracted from the signing session context (e.g., fetched using the context token). In some cases, if the user matches the user identifier of the user who provides the accept input, then the integration component displays a request to the user to provide an identity affirmation input to the user interface of the live communication session. In some cases, if the user identifier does not match the user who provides the accept input, then the integration component displays a message (such as dialog) to the user informing the user that they are not the chosen signer.

According to some aspects, after the integration component receives the identity affirmation input via the user interface of the live communication session, the integration component instructs the signing component to display the document to be signed to the affirmed user. According to some aspects, the signing component displays the document to be signed in the user interface of the live communication session.

According to some aspects, instead of displaying the document in the user interface of the live communication session, the signing component displays the document to the affirmed user in a web browser (such as a web browser implemented on a user device associated with the identified user). For example, in some cases, after the integration component receives the identity affirmation input via the user interface of the live communication session, the integration component provides a web link to the identified user, where the web link is a link to a signing page that displays the document corresponding to a URL. In some cases, the URL includes the context token for the signing session, where the context token includes a new salt value and indicates a signature step for which the context token is to be used.

According to some aspects, the user provides a link input to the web link (such as by clicking on the web link), and the integration component receives a request for the signing page in response to the link input. In some cases, when the integration component receives the request for the signing page, the integration component fetches the signing session context using the context token and evaluates the state of the context token with respect to the signing session context. In some cases, if the state of the context token differs from the state of the signing session, the integration component returns an error page to the web browser. In some cases, if the signing session context and the context token include compatible states, the integration component uses data from the signing session context to fetch a signing access token and the URL, and the URL is returned as a redirect response to the web browser to take the user to the signing page to review and sign the document.

According to some aspects, in response to the signing page opening in the web browser, the signing component prompts the user to share the web browser in the user interface of the live communication session so that the document can be discussed.

According to some aspects, the integration component receives a signature input from the identified user for the document in response to the identified user providing a signature input (for example, to the document displayed in the user interface of the live communication session, or to the web browser that displays the document). According to some aspects, the integration component updates the state of the context token in response to receiving the signature input, and based on the updated state of the context token, the signing component displays a prompt to another user identified as a signer of the document to affirm their identity and to provide a signature for the document as described above. For example, after a signer has provided a signature input for the document, the integration component receives a notification that a step associated with the signature input is complete. In some cases, the integration component then instructs the signing component to provide a message in the user interface of the communication interface indicating that the signer has completed the step, and provides a message inviting another user identified as a signer to review and provide a signature input for the document.

According to some aspects, in response to the signature input, the integration component receives a callback message indicating that a user has completed a step in the signing session, and the integration component extracts the context token from the callback message, fetches the signing session context from the database, and fetches a current state of the document. If the state of the document matches the callback message, and the state of the signing session context conforms to the expected previous step of the signing session, then the signing session context is updated to a new state (such as a state indicating that the signing session is ready for accepting another signature input, or that that the signing session is complete), the integration component provides a corresponding message to the user interface of the live communication session. In some cases, the signing session continues until either a signer rejects the document, or until the last step in the signing session (as provided by the signing session context) is completed.

At operation 420, the system generates a signed document including the signature from each of the set of users. In some cases, the operations of this step refer to, or may be performed by, a document generation component as described with reference to FIG. 3.

According to some aspects, the signing session ends when each of the set of users that is matched with the set of signers provides a signature input for the document. For example, in some cases, when a state of the signing session context indicates the signing session is complete, the signing component posts a message (such as a card or a chat comment) in the user interface of the live communication session announcing the completion of the signing session.

According to some aspects, in response to the completion of the signing session, the document generation component generates a signed document including the document to be signed, the names of the signers of the document, and signatures associated with signature inputs received by the integration component.

According to some aspects, the signed document is included in a signed agreement generated by the document generation component in response to the completion of the signing session. According to some aspects, the signed agreement is a data structure including data corresponding to the document to be signed, a form field having a value equal to a name of a signer of the document, a form field having a value equal to a signature of the signer of the document, or a combination thereof.

FIG. 5 shows an example of a document signing interface according to aspects of the present disclosure. In one aspect, document signing interface 500 includes representation of a document to be signed 505 and list of users 510 including user display names and user identifiers that are matched with signers of the document. In this cases, representation of the document to be signed 505 includes a headline "Account Services Agreement" and a blurred image of a page of the document to be signed. In some cases, list of users 510 is an ordered list, and the signing session proceeds according to the ordered list as described with reference to FIG. 4.

FIG. 6 shows an example of a computing device for document signing according to aspects of the present disclosure. In one aspect, computing device 600 includes processor(s) 605, memory subsystem 610, communication interface 615, I/O interface 620, user interface component(s) 625, and channel 630.

In some embodiments, computing device 600 is an example of, or includes aspects of, document signing apparatus 125 of FIG. 1. In some embodiments, computing device 600 includes one or more processors 605 that can execute instructions stored in memory subsystem 610 to establish a live communication session including a plurality of users, where the plurality of users correspond to a set of signers of a document; initiate a signing process during the live communication session; receiving a signature for the document from each of the plurality of users during the live communication session based on the signing process; and generate a signed document including the signature from each of the plurality of users.

According to some aspects, computing device 600 includes one or more processors 605. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 610 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 615 operates at a boundary between communicating entities (such as computing device 600, one or more user devices, a cloud, and one or more databases) and channel 630 and can record and process communications. In some cases, communication interface 615 is provided to enable a processing system coupled to a transceiver (e.g., a transmitter and/or a receiver). In some examples, the transceiver is configured to transmit (or send) and receive signals for a communications device via an antenna.

According to some aspects, I/O interface 620 is controlled by an I/O controller to manage input and output signals for computing device 600. In some cases, I/O interface 620 manages peripherals not integrated into computing device 600. In some cases, I/O interface 620 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 620 or via hardware components controlled by the I/O controller.

According to some aspects, user interface component(s) 625 enable a user to interact with computing device 600. In some cases, user interface component(s) 625 include an audio device, such as an external speaker system, an external display device such as a display screen, an input device (e.g., a remote control device interfaced with a user interface directly or through the I/O controller), or a combination thereof. In some cases, user interface component(s) 625 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for joint document signing, comprising:
establishing a real-time communication session including a plurality of users, wherein the real-time communication session comprises real-time video or audio telecommunication between each of the plurality of users and wherein the plurality of users are logged into the real-time communication session based on a plurality of authenticated user identifiers, respectively;
identifying a set of signers of a document by matching one or more of the plurality of authenticated user identifiers to one or more user identifiers included in metadata of the document;
initiating a signing session including the set of signers of the document within the real-time communication session based on the matching;
encrypting, during the signing session, a context token corresponding to a signing session context for the signing session;
transmitting, during the signing session, a link to a signing page to an affirmed user of the set of signers of the document based on the matching, wherein the link includes the encrypted context token;
decrypting, during the signing session, the context token to obtain a state of the context token;
determining, during the signing session, that the state of the context token and a state of the signing session context are compatible in response to receiving a user input from the affirmed user to the link to the signing page;
providing the signing page to a web browser of the affirmed user in response to the determination;
receiving a signature for the document via the signing page; and
closing the signing session during the real-time communication session in response to receiving the signature.

2. The method of claim 1, further comprising:
displaying a signature interface in a user interface of the real-time communication session based on the signing session, wherein the signature for the document is received via the signature interface.

3. The method of claim 1, further comprising:
receiving an input to identify the document during the real-time communication session, wherein the signing session is initiated based on the input.

4. The method of claim 1, further comprising:
receiving a confirmation input for the signing session during the real-time communication session, wherein the signing session is initiated based on the confirmation input.

5. The method of claim 1, further comprising:
generating the signing session context for the signing session, wherein the signing session context includes a plurality of stages; and
transmitting the context token during each of the plurality of stages to synchronize the signing session.

6. The method of claim 1, further comprising:
identifying the set of signers of the document; and
inviting the plurality of users to the real-time communication session based on identifying the set of signers.

7. A non-transitory computer readable medium storing instructions that, when executed by a processor, cause the processor to:
establish a real-time communication session including a plurality of users, wherein the real-time communication session comprises real-time video or audio telecommunication between each of the plurality of users and wherein the plurality of users are logged into the real-time communication session based on a plurality of authenticated user identifiers, respectively;
identify a set of signers of a document by matching one or more of the plurality of authenticated user identifiers to one or more user identifiers included in metadata of the document;
initiate a signing session including the set of signers of the document within the real-time communication session based on the matching;
encrypt, during the signing session, a context token corresponding to a signing session context for the signing session;
transmit, during the signing session, a link to a signing page to an affirmed user of the set of signers of the document based on the matching, wherein the link includes the encrypted context token;
decrypt, during the signing session, the context token to obtain a state of the context token;
determine, during the signing session, that the state of the context token and a state of the signing session context are compatible in response to receiving a user input from the affirmed user to the link to the signing page;
provide the signing page to a web browser of the affirmed user in response to the determination;
receive a signature for the document via the signing page; and
close the signing session during the real-time communication session in response to receiving the signature.

8. The non-transitory computer readable medium of claim 7, wherein the instructions further cause the processor to:
display a signature interface in a user interface of the real-time communication session based on the signing session, wherein the signature for the document is received via the signature interface.

9. The non-transitory computer readable medium of claim 7, wherein the instructions further cause the processor to:
receive an input to identify the document during the real-time communication session, wherein the signing session is initiated based on the input.

10. The non-transitory computer readable medium of claim 7, wherein the instructions further cause the processor to:
receive a confirmation input for the signing session during the real-time communication session, wherein the signing session is initiated based on the confirmation input.

11. The non-transitory computer readable medium of claim 7, wherein the instructions further cause the processor to:
generate the signing session context for the signing session, wherein the signing session context includes a plurality of stages; and
transmit the context token during each of the plurality of stages to synchronize the signing session.

12. The non-transitory computer readable medium of claim 7, wherein the instructions further cause the processor to:
identify the set of signers of the document; and
invite the plurality of users to the real-time communication session based on identifying the set of signers.

13. A system comprising:
one or more processors; and
one or more memory components coupled with the one or more processors, the one or more processors configured to:
establish a real-time communication session including a plurality of users, wherein the real-time communication session comprises real-time video or audio telecommunication between each of the plurality of users and wherein the plurality of users are logged into the real-time communication session based on a plurality of authenticated user identifiers, respectively;
identify a set of signers of a document by matching one or more of the plurality of authenticated user identifiers to one or more user identifiers included in metadata of the document;
initiate a signing session including the set of signers of the document within the real-time communication session based on the matching;
encrypt, during the signing session, a context token corresponding to a signing session context for the signing session;
transmit, during the signing session, a link to a signing page to an affirmed user of the set of signers of the document based on the matching, wherein the link includes the encrypted context token;
decrypt, during the signing session, the context token to obtain a state of the context token;
determine, during the signing session, that the state of the context token and a state of the signing session context are compatible in response to receiving a user input from the affirmed user to the link to the signing page;
provide the signing page to a web browser of the affirmed user in response to the determination;
receive a signature for the document via the signing page; and
close the signing session during the real-time communication session in response to receiving the signature.

14. The system of claim 13, the one or more processors being further configured to:
display a signature interface in a user interface of the real-time communication session based on the signing session, wherein the signature for the document is received via the signature interface.

15. The system of claim 13, the one or more processors being further configured to:
receive an input to identify the document during the real-time communication session, wherein the signing session is initiated based on the input.

* * * * *